June 6, 1950    A. B. ARNOLD    2,510,790
HEATING AND VENTILATING APPARATUS FOR MOTOR VEHICLES
Filed March 14, 1946
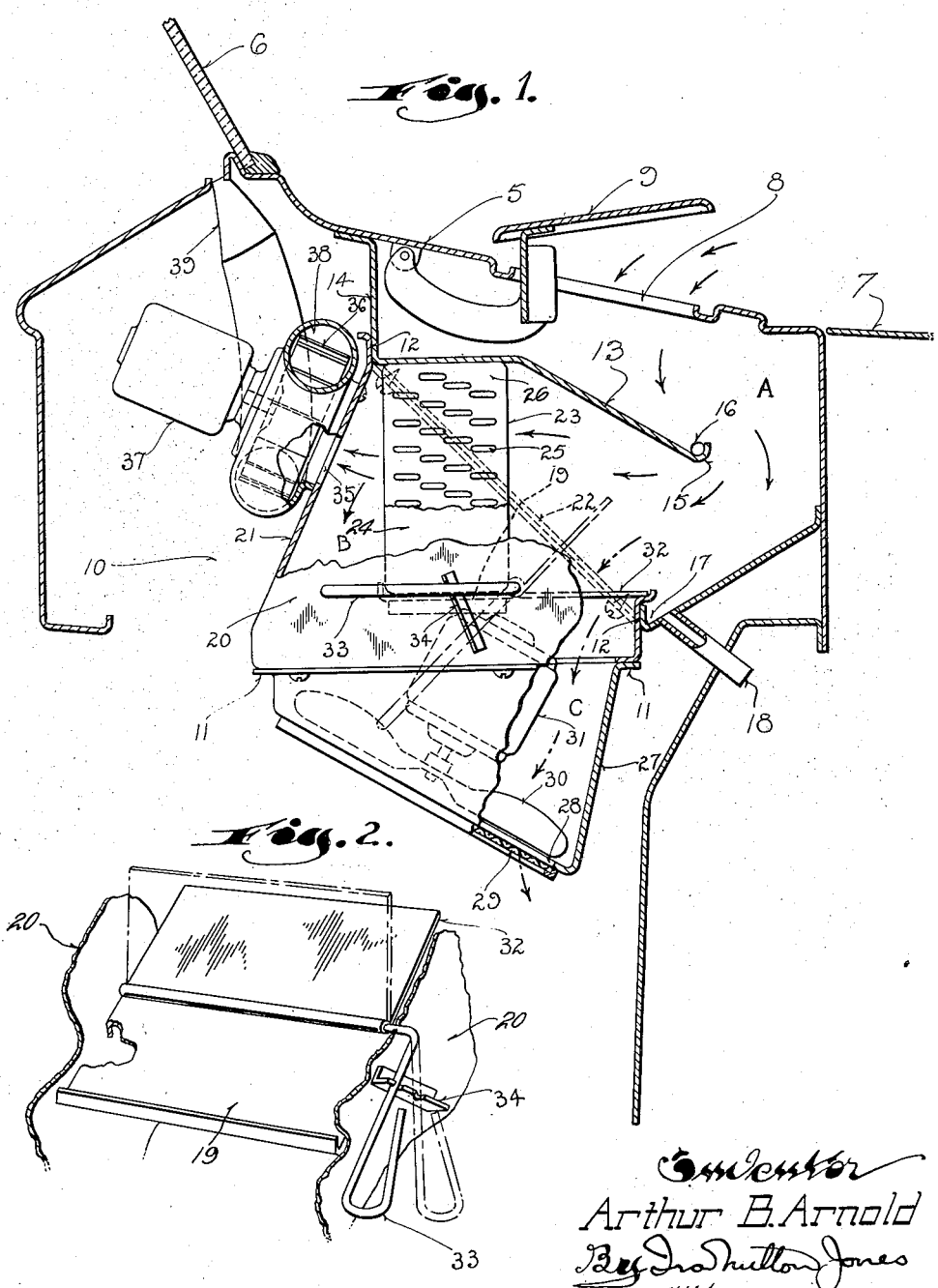

Patented June 6, 1950

2,510,790

UNITED STATES PATENT OFFICE 2,510,790

HEATING AND VENTILATING APPARATUS FOR MOTOR VEHICLES

Arthur B. Arnold, Racine, Wis., assignor to Modine Manufacturing Company, Racine, Wis., a corporation of Wisconsin Application March 14, 1946, Serial No. 654,300

9 Claims. (Cl. 98—2)

This invention relates to heating and ventilating apparatus for automobiles and trucks, and refers particularly to such devices which are mounted under the cowl of the vehicle to receive fresh air through the cowl ventilator opening.

Experience has demonstrated that past and existing automobile heating and ventilating apparatus, or air conditioners, as they are sometimes called, do not satisfactorily meet requirements. Such apparatus has three functions, namely, ventilating, heating and defrosting. The present invention not only performs these functions in a superior manner, but further, provides for their independent control.

Thus it is the purpose of this invention to provide a combination ventilating, heating, and defrosting apparatus for automobiles and trucks which is so designed and constructed that adequate ventilation is obtained under all operating conditions regardless of the weather, and in which independent temperature control and independent defroster operations are likewise possible.

In devices of this type wherein outside air is taken in through the cowl ventilator opening, rain and snow is eliminated from the air stream by suitably placed baffles and gutters. The present invention retains this method of handling rain and snow, but has as an object to so construct the unit that the baffles and gutters may be inexpensively built directly into the vehicle as a permanent part thereof. This eliminates the necessity for making water tight joints and connections at the time the heating and ventilating unit is installed.

Another object of this invention is to provide a device of the character described wherein the air entering the passenger compartment issues from the same outlet, whether it passes through the heat exchanger or by-passes the same to supply a large volume of ventilating air for cooling purposes in hot weather, and further wherein a multispeed fan mounted in the single outlet provides for adequate air admission under all operating conditions.

A further object of this invention is to provide an improved manner of withdrawing heated air issuing from the heat exchanger and directing it to the discharge nozzles of a windshield defroster, whereby defroster operation independent of the ventilating fan is simply and inexpensively obtained.

With the above and other objects in view, which will appear as the description proceeds, this invention resides in the novel construction and arrangement of parts substantially as hereinafter described, and more particularly defined by the appended claims, it being understood that such changes in the precise embodiment of the hereindisclosed invention may be made as come within the scope of the claims.

The accompanying drawing illustrates one complete example of the physical embodiment of the invention constructed in accordance with the best mode so far devised for the practical application of the principles thereof, and in which:

Figure 1 is a vertical sectional view through the cowl portion of an automobile and the combination ventilator, heater and defroster of this invention; and Figure 2 is a detail perspective view showing the damper by which air flow through the unit is controlled.

Referring now particularly to the accompanying drawing, the numeral 5 designates the cowl of an automobile or truck cab, which as is customary extends from the lower edge of the windshield 6 to the hood 7. The cowl has the usual ventilator opening 8 adapted to be closed by a door or cover 9 which is manually opened and closed by means of a suitable handle, not shown.

Positioned under the cowl is a duct designated generally by the numeral 10 and composed of three serially connected sections, A, B and C. Section A is built into the vehicle as a permanent part thereof. It constitutes the inlet end of the duct and is adapted to receive fresh air through the cowl ventilator opening. Sections B and C together comprise the attachable part of the unit. These sections are joined along a horizontal plane defined by the top of a flange 11 on the bottom section C. The juncture of the section B to the section A is along an inclined plane defined by meeting flanges 12 on these sections.

By virtue of the fact that the permanent section A has moisture trapping and dispensing means embodied therein, the joints between the duct sections need not be watertight. The moisture collecting and dissipating means includes a baffle 13 extending transversely across the duct section A. This baffle projects horizontally forwardly from the lower edge of the rear wall 14 (of the duct section A) to a point substantially in line with rear edge of the ventilator opening 8, at which point it is inclined downwardly to terminate in a gutter 15.

The gutter 15, which leads to a drain opening 16 in one side wall of the duct section lies sufficiently forward to catch water dropping straight down through the ventilator opening. It also overhangs a second gutter 17 at the lower edge of a rearwardly inclined front wall portion of the duct section A. A drain 18 leads from this second gutter.

The center duct section B has a transverse wall 19 extending from one side wall 20 to the other. The front and rear edges of this transverse wall are spaced from the front and rear walls 21 and 22 respectively, of the duct section B, so as to leave two passages past this wall 19.

Seated on the transverse wall 19 and filling the entire space between it and the horizontal portion of the baffle 13, in line with which the wall 19 is located, is a heat exchanger 23. Preferably this heat exchanger is of the radiator core type adapted to be supplied with hot water from the cooling system of the vehicle. Its headers 24 are arranged vertically along the side walls 20 and its core passages 25 extend horizontally, so that the usual fins 26 are vertical and edgewise to the air flow through the unit.

While the heat exchanger reaches up into the duct section A, it is so assembled with the section B that upon joining the two sections it is properly located.

Though not shown, it is of course, understood that the headers 24 of the heat exchanger are appropriately connected with the cooling system of the vehicle engine, and that valve means may be provided to control circulation of the hot water therethrough to thereby effect some regulation of the temperature within the passenger compartment. For an illustration of the hot water control, reference may be had to Patent No. 2,213,016, issued to C. T. Perkins August 27, 1940.

The bottom duct section C provides the main outlet of the duct through which the air discharges into the passenger compartment. Its sides 27 taper inwardly to terminate in a round opening 28 covered by a guard screen 29. Preferably the screened outlet lies on a rearwardly inclined plane so as to better direct the air into the passenger compartment.

A fan 30 driven by a multispeed motor 31 is mounted in the bottom duct section C to provide means for effecting air flow through the duct independently of the air influx resulting from forward motion of the vehicle with the cowl ventilator door 9 open.

By virtue of the positional relationship which exists between the baffle 13 and the heat exchanger, the air must make a sharp turn around the overhanging edge of the baffle to reach the heat exchanger. Thus if the space between the lower front edge of the shelf-like wall 19 on which the heat exchanger rests, is open, much of the air rounding the baffle will by-pass the heat exchanger. Consequently, this space provides a by-pass through which outside air may flow in large volume from the cowl ventilator opening directly into the passenger compartment. A damper 32 hingedly mounted along the front edge of the shelf-like wall 19 controls flow through the by-pass. The damper may be swung from a closed position, shown in full lines to an open position shown in broken lines.

In its closed position the damper directs all the air entering the duct into and through the heat exchanger. In its open position the damper not only opens the by-pass but occupies a position blocking much of the path to the heat exchanger and deflecting the main body of the air rounding the baffle down through the by-pass to unrestrictedly issue from the main outlet 28 and enter the passenger compartment in large volume. It is of course to be understood that the cross sectional area of all portions of the duct from the cowl ventilator opening 8 down through the by-pass and the main outlet 28 is at least as large as the ventilator opening. Thus when the by-pass is open, a large volume of air may be caused to enter the passenger compartment either by the natural influx resulting from forward motion of the vehicle with the cowl ventilator open or by the fan 30. Best results are obtained through use of the fan, especially in hot weather. In cold weather when the damper is closed and all air moves through the heat exchanger a slow fan speed or none at all is best.

Adjustment of the damper may be effected in any desired manner, and in the present instance a handle 33 fixed to the damper moves across one side wall 20 of the duct section B. A two-notch detent 34 fixed to this side wall provides means for releasably holding the handle and hence the damper in open or closed position.

Attention is directed to the positional relationship between the heat exchanger, by-pass damper, and the main outlet 28. By virtue of this arrangement of these parts, the fan in the main outlet draws air from either the input or discharge side of the heat exchanger. Another desirable feature achieved by this arrangement is that it provides an exceptionally convenient and effective manner of drawing off hot air for windshield defrosting. To this end the rear wall 21 of the duct section B has an auxiliary outlet 35 directly in line with the discharge side of the heat exchanger. Mounted on the wall 21 over the outlet 35 is a fan 36 driven by a motor 37. The blower housing of this fan has two discharge ducts 38 (only one being shown) which lead tangentially from the housing in opposite directions to feed nozzles 39 positioned to direct the heated air streams upwardly against the inside of the windshield.

Inasmuch as the defroster unit is entirely independent of the fan 30, it follows that adequate defroster operation is possible without entailing discomfort to the vehicle occupants. The fan 30 may be operated if desirable, but it need not be as it is not required for defroster operation.

From the foregoing description taken in connection with the accompanying drawing, it is noted that this invention provides a novel combination ventilating and heating device for automobiles or trucks which makes possible direct fresh air ventilation by diverting the air entering the same past the heat exchanger and directly into the passenger compartment.

What I claim as my invention is:

1. In a ventilating and air conditioning device for an automotive vehicle having a cowl provided with a ventilator opening in its top wall; means defining a duct under the cowl in position to receive air through the cowl ventilator opening, said duct having an outlet at the bottom thereof leading to the passenger compartment and having a rearwardly downwardly inclined rear wall portion; a partition wall extending transversely across the duct from sidewall to sidewall thereof, said partition wall being substantially horizontal and spaced from the rear and front walls of the duct; a baffle within the duct projecting forwardly from the rear wall thereof to a position under the cowl ventilator opening, said baffle coacting with the partition wall to define a substantially horizontal air passage leading from the forepart of the duct to said downwardly rearwardly inclined rear wall portion thereof; a heat exchanger in the space between the partition wall and the portion of the baffle thereabove, the space between the partition wall and the adjacent portion of the front wall of the duct providing a by-pass around the heat exchanger for conducting fresh air directly from the cowl ventilator opening to the outlet; means for closing said by-pass at will; and a fan for drawing air through either or both of the passages into which the duct is divided by the partition wall.

2. In a ventilating and air conditioning device for an automotive vehicle having a cowl provided with a ventilator opening in its top wall: means defining a duct under the cowl in position to receive air through the cowl ventilator opening, said duct having an outlet at the bottom thereof leading to the passenger compartment and having a rearwardly downwardly inclined rear wall portion; a partition wall extending transversely across the duct from sidewall to sidewall thereof, said partition wall being substantially horizontal and spaced from the rear and front walls of the duct; a baffle within the duct projecting forwardly from the rear wall thereof to a position under the cowl ventilator opening, said baffle coacting with the partition wall to define a substantially horizontal air passage leading from the forepart of the duct to said downwardly rearwardly inclined rear wall portion thereof; a heat exchanger in the space between the partition wall and the portion of the baffle thereabove, the space between the partition wall and the adjacent portion of the front wall of the duct providing a by-pass around the heat exchanger for conducting fresh air directly from the cowl ventilator opening to the outlet; means for closing said by-pass at will; a fan for drawing air through either or both of the passages into which the duct is divided by the partition wall, said downwardly rearwardly inclined rear wall portion having an outlet opening adapted to receive air issuing from the heat exchanger; and a windshield defroster unit mounted on said rear wall portion over said outlet opening, said windshield defroster unit including a motor driven fan and a discharge duct leading to a nozzle positioned to direct air against the inside of the windshield.

3. In an automotive vehicle having a cowl provided with a ventilator opening in the top wall thereof; means fixed with relation to the cowl at the underside thereof defining an upper section of a duct through which air entering the cowl ventilator opening reaches the passenger compartment; baffle means in said upper duct section having a downwardly sloping portion thereof under the cowl ventilator opening to deflect precipitation entering the cowl ventilator opening to thereby prevent direct movement of such precipitation through the upper duct section; gutter means built into the upper duct section for collecting precipitation entering the cowl ventilator opening; means defining a lower duct portion adapted for attachment to said upper duct section, said lower duct portion having an outlet in the bottom thereof for discharging air to the passenger compartment of the vehicle; a transverse partition wall in said lower duct portion, said partition wall dividing the duct into two passages each of which connects the outlet with the cowl ventilator opening independently of the other; a heat exchanger supported on said partition wall and projecting up into the upper duct section to said baffle means when the lower duct portion is attached to the upper duct section, whereby said heat exchanger extends across one of said two passages, the other of said two passages providing a by-pass around the heat exchanger; and means for controlling airflow through said by-pass.

4. A device of the character described comprising: a duct having an air inlet at its top and two outlets, one at the bottom and one in one of the upright walls of the duct; a baffle extending substantially horizontally from said designated upright wall above the outlet therein; a heat exchanger directly under and extending downwardly from said baffle with its discharge side in juxtaposition to but spaced from said designated wall and its inlet side spaced from the wall of the duct opposite said designated wall of the duct, the baffle overhanging the heat exchanger at the inlet side thereof but permitting air which enters the duct to flow around the baffle and through the heat exchanger to reach both outlets; and a damper movable to a closed position extending across the space between the bottom of the heat exchanger at its inlet side and the wall of the duct opposite said designated upright wall to direct all air entering the duct through the heat exchanger, and movable to an open position projecting toward the overhanging end of the baffle so that air flowing around the baffle is deflected past the heat exchanger and toward the bottom outlet.

5. A device of the character described comprising: a duct having an inlet at the top, a main outlet at the bottom and an auxiliary outlet in its rear wall; a baffle extending forwardly from the rear wall above the auxiliary outlet; a heat exchanger in the duct extending from sidewall to sidewall and positioned directly under and extending down from the baffle and in spaced relation to the front and rear walls of the duct so that air flowing around the forward end of the baffle may by-pass the heat exchanger to reach the main outlet or flow through the heat exchanger to reach both outlets; a windshield defroster unit having a fan mounted on the rear wall of the duct over the auxiliary outlet to receive air from the duct; an imperforate wall extending across the underside of the heat exchanger from side wall to side wall of the duct but spaced from the front and rear walls of the duct; a damper hinged along the front edge of the imperforate wall, said damper extending from side wall to side wall of the duct and having a width sufficient to span the space between the front edge of said imperforate wall and the front wall of the duct; and means for swinging said damper between a closed position shutting off airflow past the heat exchanger and the front edge of said imperforate wall to an open position permitting air to by-pass the heat exchanger in reaching the main outlet.

6. In a ventilating and air conditioning device for an automotive vehicle having a cowl provided with a ventilator opening in its top wall: means defining a duct under the cowl and in a position to receive air through the cowl ventilator opening; an air heater having its air inlet and outlet opposite one another so that air flows therethrough in a straight line, said heater extending across said duct and having all but one of its side walls abutting the side walls of said duct so that the space between said one side wall of the heater and an adjacent wall of the duct defines a bypass through which air taken in through the ventilator opening is adapted to pass around the heater; means defining an outlet communicated with both the outlet of said heater and with said bypass and debouching into the interior of the vehicle whereby air which has been taken in through said ventilator opening may be discharged into the interior of the vehicle; a damper extending from one side wall of the duct to the other and movable between two positions, in one of which it extends from said one side wall of the heater to said adjacent wall of the duct, to thereby obstruct said bypass and constrain air taken in through the ventilator opening to pass through the heater on its way to the interior of the vehicle, and in the other of which it partially obstructs the inlet of the heat exchanger and constrains said air to flow through the bypass; and a windshield defroster outlet in said duct substantially in line with the outlet of the heat exchanger whereby heated air may at all times be provided for windshield defrosting.

7. In a ventilating and air conditioning device for an automotive vehicle having a cowl provided with a ventilator opening in its top wall: means defining a duct under the cowl in a position to receive air through the cowl ventilator opening, said means including side walls, a substantially horizontal upper wall extending from side wall to side wall, and a rear wall extending below said horizontal wall, said duct means having a downwardly and rearwardly directed outlet at its bottom; a heater extending downwardly from said horizontal wall and from side wall to side wall, said heater having its inlet, outlet and bottom spaced from the adjacent duct walls; a damper extending from one side wall of the duct to the other, said damper being movable to a position in which it extends from said bottom wall of the heater to the side wall of the duct adjacent the heater inlet, to constrain all of the air entering the cowl ventilator opening to flow through said heater and thence to said outlet at the bottom of the duct, or to a position partly obstructing the heater inlet and permitting such air to pass around the bottom of the heater and thence through said outlet; and a windshield defroster outlet in said rear wall of the duct, substantially in line with the outlet of the heater, through which heated air may at all times be withdrawn from the heater outlet for windshield defrosting.

8. A device of the character described comprising: a duct having an inlet at its top, a main outlet at its bottom, an auxiliary outlet at its rear wall and a horizontal wall extending forwardly from said rear wall above said auxiliary outlet; a heat exchanger in the duct extending from side wall to side wall and positioned directly under and extending down from said horizontal wall, with its inlet and outlet spaced from the front and rear walls of the duct, respectively, said heat exchanger having its bottom spaced from the bottom of the duct so that air flowing toward the inlet of the heat exchanger may flow therethrough to reach both outlets or may pass beneath the heat exchanger to reach the main outlet; a windshield defroster unit mounted on the rear wall of the duct and communicated with the auxiliary outlet to receive air from the outlet of the heat exchanger; a damper hinged along the bottom of the inlet of the heat exchanger, extending from side wall to side wall of the duct and having a width sufficient to span the space between the bottom of the inlet of the heat exchanger and the front wall of the duct; and means for swinging said damper between a closed position shutting off air flow past the heat exchanger and around the bottom thereof to the main outlet, to an open position permitting air to bypass the heat exchanger in reaching the main outlet.

9. In a ventilating and air conditioning device for automobiles: means defining a duct having an inlet and having a primary outlet; a partition wall extending across the passageway of the duct to divide the same into main and bypass branches, each connecting the inlet and primary outlet of the duct independently of the other; a fan at the primary outlet of the duct for drawing air into the inlet of the duct and through said branches thereof; a heat exchanger extending across the passageway of the main branch of the duct; a single damper pivotally mounted on said partition wall adjacent to the inlet of the bypass branch to swing from a closed position shutting off air flow through the bypass branch and permitting free flow of air through the main branch, to an open position extending crosswise of the main branch ahead of the heat exchanger to deflect air drawn into the duct away from the main branch and into the bypass branch; an actuator for the damper for selectively closing and opening the bypass branch; a secondary outlet opening in a wall of the main branch opposite the downstream side of the heat exchanger; and windshield defroster means leading from the secondary outlet.

ARTHUR B. ARNOLD.

REFERENCES CITED

The following references are of record in the file of this patent:

UNITED STATES PATENTS

| Number | Name | Date |
|---|---|---|
| 2,026,929 | Backe | Jan. 7, 1936 |
| 2,213,016 | Perkins | Aug. 27, 1940 |
| 2,235,642 | Lintern et al. | Mar. 18, 1941 |
| 2,295,750 | Norris et al. | Sept. 15, 1942 |
| 2,306,796 | Staley et al. | Dec. 29, 1942 |
| 2,355,151 | Findley | Aug. 8, 1944 |
| 2,372,377 | Hans | Mar. 27, 1945 |